(12) United States Patent
McClure et al.

(10) Patent No.: US 7,766,416 B2
(45) Date of Patent: Aug. 3, 2010

(54) WALL STRUCTURE OF VEHICLE FRAME BETWEEN CAB AND LOAD-CARRYING BED

(75) Inventors: Kerry S. McClure, Dublin, OH (US); Anthony Ordonio, Jr., Dublin, OH (US); John K. Bertoli, Columbus, OH (US); Ryan M. Mahn, Hilliard, OH (US)

(73) Assignee: Honda Motor Co. Ltd., Tokyo (JP)

( * ) Notice: Subject to any disclaimer, the term of this patent is extended or adjusted under 35 U.S.C. 154(b) by 319 days.

(21) Appl. No.: 11/272,387

(22) Filed: Nov. 10, 2005

(65) Prior Publication Data

US 2006/0108831 A1    May 25, 2006

Related U.S. Application Data

(60) Provisional application No. 60/627,533, filed on Nov. 12, 2004.

(51) Int. Cl.
*B62D 33/02*    (2006.01)
(52) U.S. Cl. .............. 296/182.1; 296/181.3; 296/183.1; 296/203.03
(58) Field of Classification Search .............. 296/182.1, 296/183.1, 190.01, 190.04, 190.8, 191, 193.03, 296/193.04, 193.05, 193.08, 203.01–203.04, 296/205, 29, 57.1, 146.8, 181.3
See application file for complete search history.

(56) References Cited

U.S. PATENT DOCUMENTS

| | | | |
|---|---|---|---|
| 4,379,545 A | 4/1983 | Gray et al. | |
| 4,729,156 A | 3/1988 | Norris, Jr. et al. | |
| 4,819,980 A | 4/1989 | Sakata et al. | |
| 5,131,714 A | 7/1992 | Evans, Sr. et al. | |
| 5,263,757 A * | 11/1993 | Reed | 296/24.43 |
| 5,660,427 A | 8/1997 | Freeman et al. | |
| 5,729,463 A | 3/1998 | Koenig et al. | |
| 5,732,995 A * | 3/1998 | Piccariello | 296/57.1 |
| 5,788,322 A * | 8/1998 | Wolf et al. | 296/181.4 |
| 6,141,935 A | 11/2000 | Artner et al. | |
| 6,206,459 B1 | 3/2001 | Kim | |
| 6,223,470 B1 * | 5/2001 | Millard et al. | 49/374 |
| 6,241,309 B1 * | 6/2001 | Roehl et al. | 296/203.04 |
| 6,260,914 B1 | 7/2001 | Nieminski et al. | |
| 6,260,916 B1 * | 7/2001 | Hunt | 296/190.11 |
| 6,286,896 B1 | 9/2001 | Eipper et al. | |
| 6,328,366 B1 | 12/2001 | Foster et al. | |
| 6,367,867 B1 | 4/2002 | Kolarik et al. | |
| 6,419,302 B2 | 7/2002 | Mikuni | |
| 6,443,518 B1 * | 9/2002 | Rohl et al. | 296/203.01 |

(Continued)

FOREIGN PATENT DOCUMENTS

CN    2099057    3/1992

*Primary Examiner*—Glenn Dayoan
*Assistant Examiner*—Gregory Blankenship
(74) *Attorney, Agent, or Firm*—Mark E. Duell; Rankin, Hill & Clark LLP (57) ABSTRACT

A vehicle frame having a cab portion and a load-carrying bed includes sidewall structures opposed and spaced from one another forming sides of the cab portion and sides of the load-carrying bed. A wall structure extends between the spaced sidewall structures and separates the cab portion and the load-carrying bed. The wall structure forms a rear wall of the cab portion and a forward wall of the load-carrying bed.

20 Claims, 6 Drawing Sheets

U.S. PATENT DOCUMENTS

| | | | |
|---|---|---|---|
| 6,447,051 B1 * | 9/2002 | Lukomskiy | 296/183.1 |
| 6,520,562 B2 * | 2/2003 | Pyo | 296/183.1 |
| 6,533,348 B1 * | 3/2003 | Jaekel et al. | 296/205 |
| 6,550,849 B1 | 4/2003 | Dosdall | |
| 6,648,400 B2 | 11/2003 | Takahashi et al. | |
| 6,648,401 B2 | 11/2003 | Behnke et al. | |
| 6,695,394 B2 | 2/2004 | Takahashi | |
| 6,702,365 B2 * | 3/2004 | Semple et al. | 296/183.1 |
| 6,802,558 B2 * | 10/2004 | Matsuoka | 296/203.04 |
| 6,824,204 B2 * | 11/2004 | Gabbianelli et al. | 296/205 |
| 6,893,080 B2 * | 5/2005 | Hashimoto | 296/190.11 |
| 2002/0079715 A1 | 6/2002 | Hong | |
| 2003/0001409 A1 * | 1/2003 | Semple et al. | 296/183 |
| 2003/0011212 A1 | 1/2003 | Hashimoto et al. | |
| 2003/0102696 A1 * | 6/2003 | Matsuoka | 296/203.04 |
| 2003/0122394 A1 * | 7/2003 | Hashimoto | 296/24.1 |
| 2003/0122401 A1 * | 7/2003 | Hashimoto | 296/190.11 |
| 2005/0236867 A1 * | 10/2005 | McNulty et al. | 296/183.1 |

\* cited by examiner

FIG. 6 ial Patent Application Ser. No. 60/627,533, filed Nov. 12, 2004, entitled "Wall Structure of Vehicle Frame Between Cab and Load-Carrying Bed".

WALL STRUCTURE OF VEHICLE FRAME BETWEEN CAB AND LOAD-CARRYING BED

This application claims priority of Provisional Patent Application Ser. No. 60/627,533, filed Nov. 12, 2004, entitled "Wall Structure of Vehicle Frame Between Cab and Load-Carrying Bed".

BACKGROUND

The present disclosure relates to a vehicle frame and, more particularly, to a frame subcomponent for separating a vehicle's cab portion and its load-carrying bed. In one embodiment, the frame subcomponent is a wall structure disposed on and between spaced frame rails of the vehicle's frame and will be described with particular reference thereto. However, it is to be appreciated that the frame subcomponent could relate to other similar environments and applications.

Frames on pickup trucks and like vehicles often include a pair of spaced frame rails extending along the length of the vehicle. Cross members are used to connect the spaced frame rails and, together with the frame rails, provide a rigid ladder-like frame upon which a cab structure and a load-carrying bed structure can be mounted. Typically, the frame consisting of the frame rails and cross members is subassembled independently of the cab structure and the load-carrying bed structure. Likewise, the cab and load carrying-bed structures are subassembled separately and independently of one another. Once these components are subassembled, the cab structure and the bed structure, which are sometimes together referred to as the vehicle body, are mounted to the frame with conventional body mounts.

Conventional load-carrying bed structures are often open-box structures including a rectangular bed floor, sidewalls extending upward from three of four edges of the bed floor and an openable tailgate extending along the remaining edge of the bed floor. When mounted to a ladder-like vehicle frame, the tailgate is oriented at one end of the frame rails opposite the cab structure. The sidewalls include two opposed lateral sidewalls and a forward sidewall positioned opposite the tailgate.

In conventional bed structures, the forward sidewall is generally a free-standing wall that is independent of the cab structure, i.e., the forward sidewall is not shared by the cab structure. Likewise, the independently assembled cab structure is an enclosed structure that includes a rear wall that is separate from the bed structure. While the cab structure and bed structures can be connected to one another, typically they are each entirely independent structures. Thus, the forward sidewall of the bed structure and the rear wall of the bed structure extend along side one another in generally parallel, but spaced, relation.

BRIEF SUMMARY

According to one aspect, a vehicle frame having a cab portion and a load-carrying bed is provided. More particularly, in accordance with this aspect, the vehicle frame includes sidewall structures opposed and spaced from one another forming sides of the cab portion and sides of the load-carrying bed. A wall structure extends between the spaced sidewall structures and separates the cab portion and the load-carrying bed. The wall structure forms a rear wall of the cab portion and a forward wall of the load-carrying bed.

According to another aspect, a unibody frame is provided in a vehicle having a load-carrying bed and a cab portion. More particularly, in accordance with this aspect, the unibody frame includes a platform portion including frame rails spaced apart from one another and adjacent sides of the vehicle and at least one cross member extending between and connecting the frame rails. Principal body panels connect to the platform portion. The principal body panels include opposed, side panel structures forming sides of the vehicle and a wall structure extending between the side panel structure and dividing the load-carrying bed and the cab portion. The wall structure includes a panel portion oriented approximately normal relative to the side panel structures and a hollow frame surrounding the panel portion.

According to still another aspect, a wall structure is provided in a vehicle frame separating a cab portion and a load-carrying bed. More particularly, in accordance with this aspect, the wall structure includes a panel portion forming a rear wall of the cab portion and a forward wall of the load-carrying bed. At least one hollow beam portion extends horizontally between side panel structures of the unibody vehicle frame to reinforce the panel portion.

DETAILED DESCRIPTION

Figure 1:
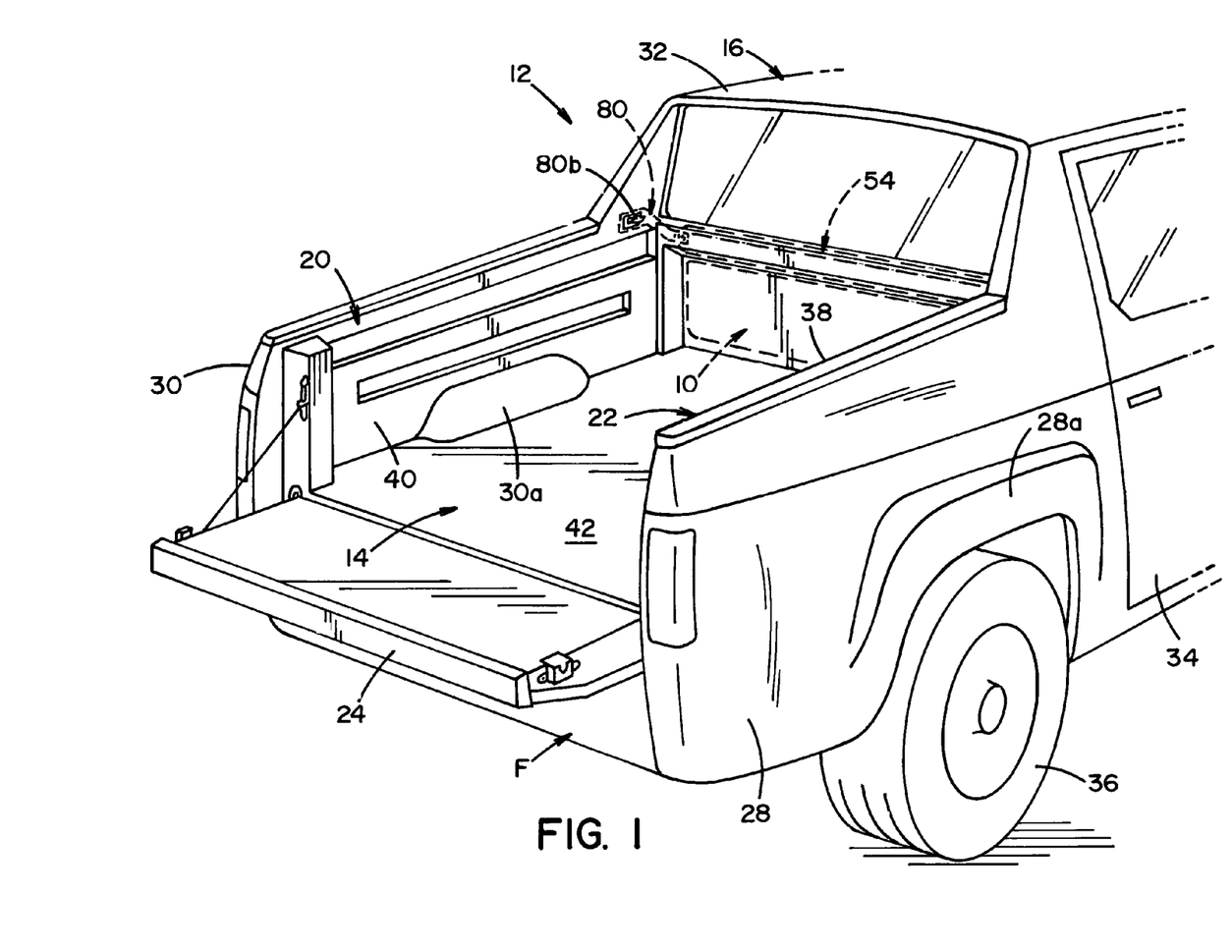
FIG. 1 is a partial perspective view of a vehicle having a frame (at least partially shown in hidden lines) including a wall structure between a cab portion and load-carrying bed.

Referring now to the drawings wherein the showings are for purposes of illustrating one or more embodiments only and not for purposes of limiting the same, FIG. 1 shows wall structure 10 provided in a vehicle 12 having a load-carrying bed 14 and a cab portion 16. The wall structure 10 forms a portion of the vehicle's frame F and separates the load-carrying bed 14 and the cab portion 16. In the illustrated embodiment, the vehicle is a sport utility truck (SUT), but it is to be appreciated by those skilled in the art that the vehicle 14 could alternately be any other type of vehicle having a bed, such as a pickup truck, utility truck or other vehicle. The bed 14 includes sidewalls 20,22 which, together with the wall structure 10, enclose three sides of the bed. A tailgate 24 is pivotally mounted adjacent the-remaining open side and is selectively movable between a closed position and at least a fold-down position (shown in FIG. 1).

Figure 2:
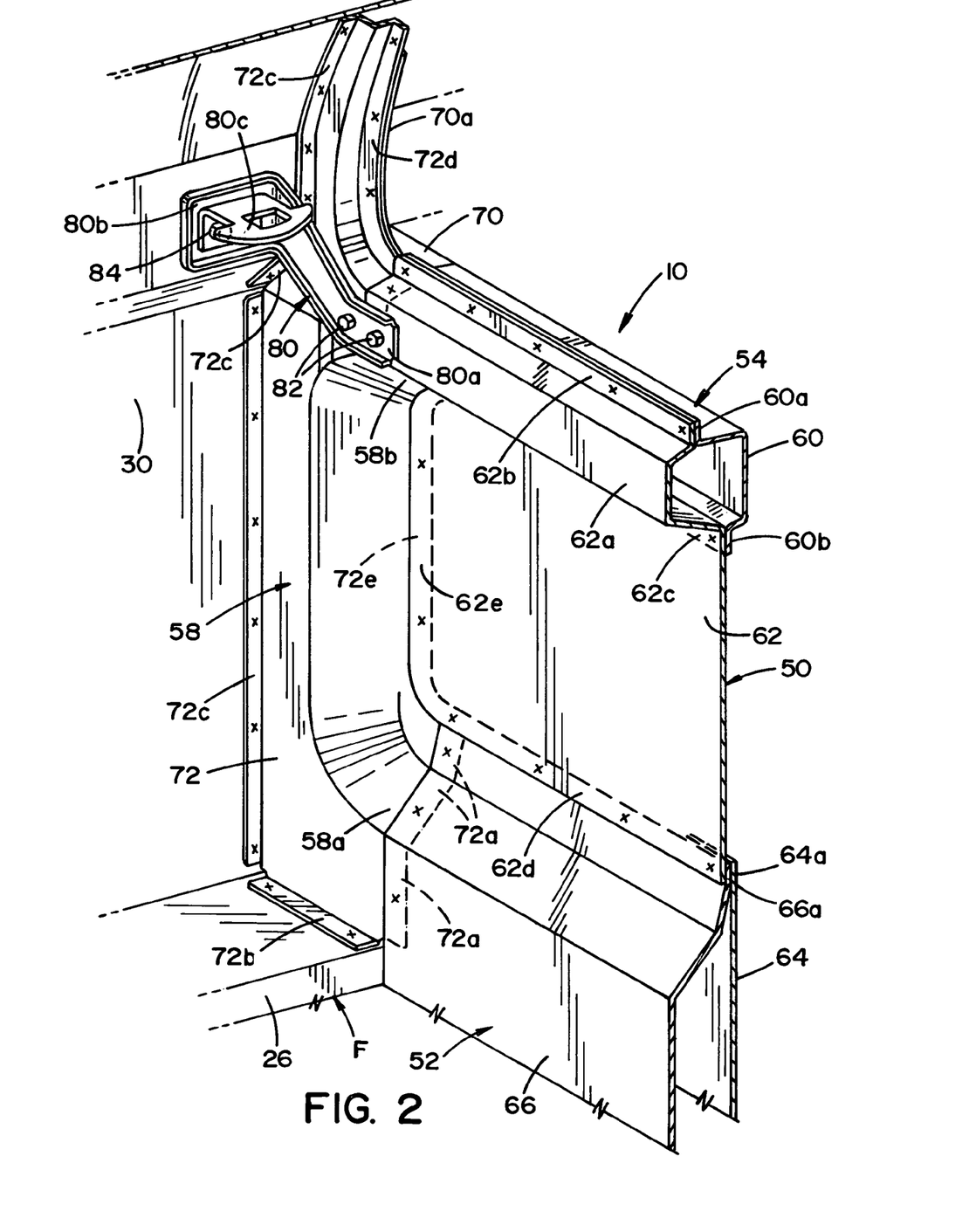
FIG. 2 is a partial rear perspective view of the wall structure (shown with a floor and side panel members of the load-carrying bed removed) including a bracket connecting the wall structure to a side panel structure of the vehicle frame.

In the illustrated embodiment, the frame F of the vehicle 12 is a unibody frame wherein principal body panels of the vehicle are combined with a platform portion of the vehicle frame to form to form a single, integrated frame assembly. The platform portion of the vehicle 12 is not shown in detail, but generally includes a pair of spaced frame rails (a portion of one of the frame rails 26 is shown in FIG. 2) extending along a substantial portion of a longitudinal length of the vehicle and a plurality of cross members extending between the spaced frame rails. Each of the frame rails extends along a respective side of the vehicle and each of the cross members generally extends transversely across the vehicle 12 connecting the frame rails. The principal body panels and/or the platform portion can be formed of any suitable material, such as aluminum or steel.

The principal body panels include side panel structures 28,30 which form respectively, first and second sides of the vehicle 12. More particularly, the side panel structure 28,30, which are opposed and spaced from one another, partially form, respectively, the first and second sidewalls 20,22 of the vehicle bed 14 and partially form, respectively, sidewalls of the cab portion 16. The principal body panels further include roof 32 forming the cab portion 16 and connecting the side panel structures 28,30 and the wall structure 10, also referred to herein as a cross structure, separating the cab portion 16 from the bed 14. As is well known to the those skilled in the art, the side panel structures 28,30 include openings for side doors (only door 34 shown) which provide access into the cab portion and wheel well portions 28a,30a which are recessed to accommodate wheels (only wheel 36 shown) of the vehicle 12. To form the integrated unibody vehicle frame, the principal body panels, including structures 28,30,32,10, are generally welded together and welded to the platform portion.

Side panel members 38,40 can be mounted to inner sides of the side panel structures 28,30 over the wheel well portions 28a,30a to further form part of the bed sidewalls 20,22. In one embodiment, the side panel members 38,40 are formed of SMC (sheet molded compound) and provide a bed surface that is relatively dent resistant. Bed floor 42 is provided between the side panel members 38,40 and supported by the platform portion of the frame. Like the side panels 38,30, the bed floor 42 can be formed of SMC to provide a relatively dent resistant bed surface.

With additional reference to FIG. 2, the wall structure 10 extends between the sidewall structures 28,30 and separates the cab portion 16 and the load-carrying bed 14. As illustrated, the wall structure 10 forms a rear wall of the cab portion and a forward wall of the load-carrying bed. In the illustrated embodiment, the wall structure 10 includes a single panel portion 50 oriented approximately normal relative to the side panel structures 28,30. The wall structure 10 further includes a lower beam portion 52, an upper beam portion 54 and opposed, side beam portions 56,58 (beam portion 56 partially shown schematically in FIG. 3).

The beam portions 52,54,56,58 are hollow structural members that extend along a perimeter of the panel portion 50 and thereby form a rectangular frame structure around or surrounding the panel portion. More particularly, the side beam portions 56,58 extend generally vertically along respective side panel structures 28,30 and connect the panel portion 50 to the side panel structures and the frame rails 26 disposed below the side panel structures. The lower and upper beam portions 52,54 extend generally horizontally between the side panel structures and, more particularly, between the beam portions 56,58. The beam portions 52,54,56,58 function to reinforce the panel portion 50.

Figure 5:
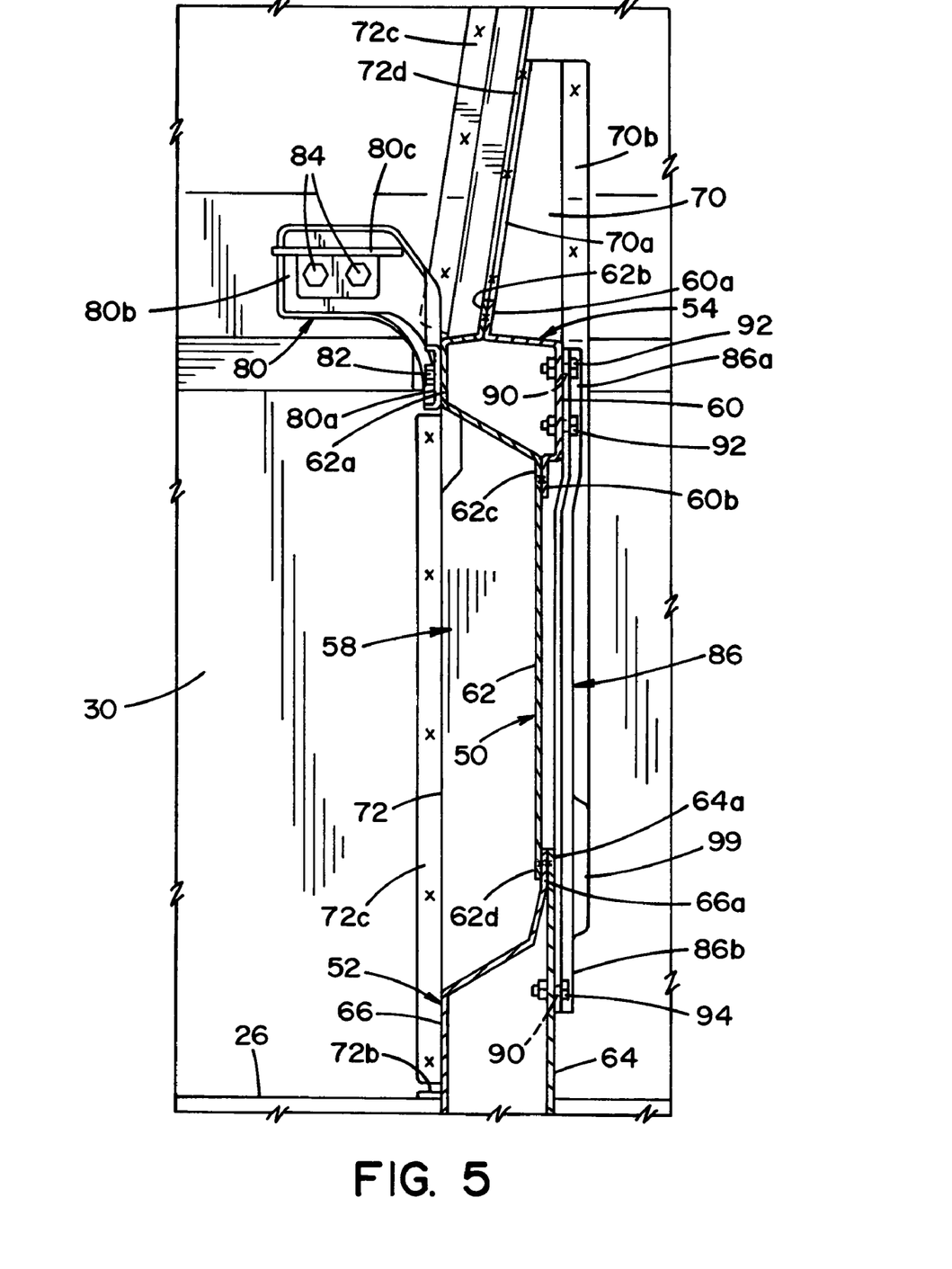
FIG. 5 is a cross-sectional view of the wall structure taken along the line 5-5 of FIG. 4.
Figure 6:
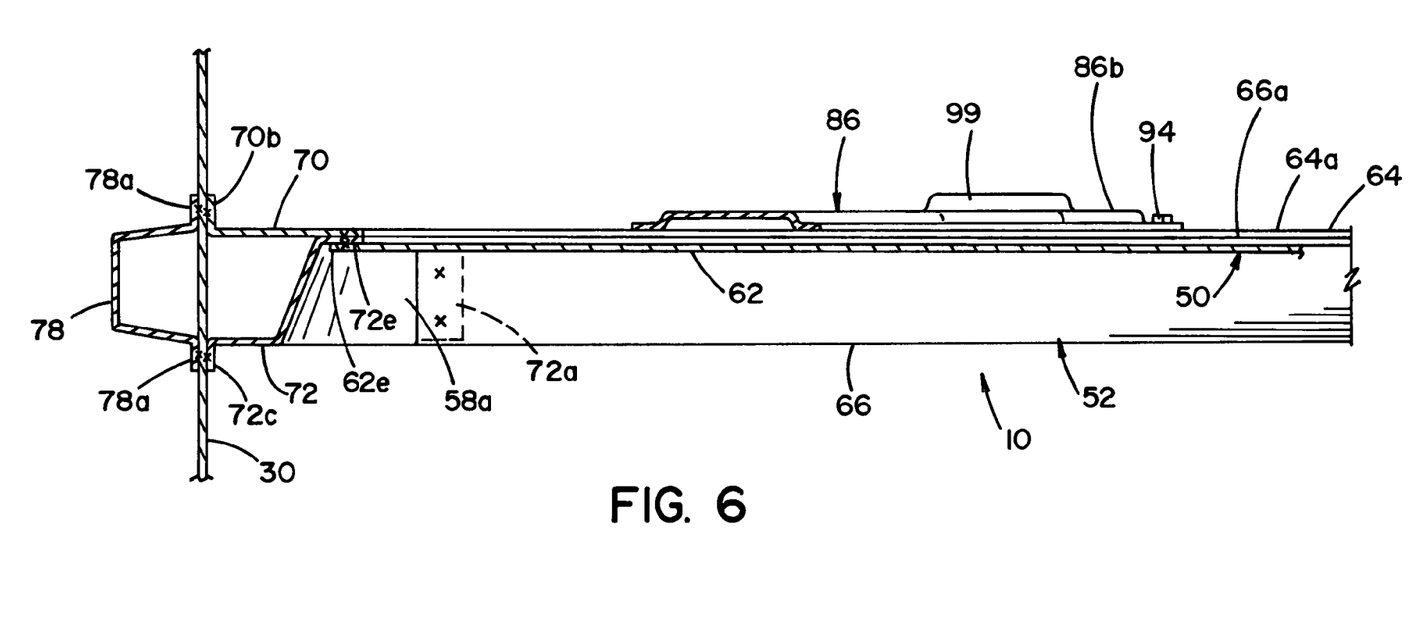
FIG. 6 is a cross-sectional view of the wall structure taken along the line 6-6 of FIG. 4.

In the illustrated embodiment, with continued reference to FIG. 2 AND FIGS. 5 and 6, the upper beam portion 54 is formed of a cab-side upper member 60 and a bed-side beam portion 62a of a panel member 62. The panel portion 50 is formed by a remainder of the panel member 62. As used herein, "cab-side" refers to the positioning of an element relative to the cab portion 16 and bed-side refers to the positioning of an element relative to the bed 14. Thus, the cab-side member 60 is on the side of the structure 10 closest to the cab portion 16 and the bed-side beam portion 62a is on the side of the structure 10 closest to the bed 14. An upper flange 60a of the upper member 60 mates with upper flange 62b of the panel member 62 to provide a seam along which the upper member 60 can be welded to the panel member 62. A lower flange 60b of the upper member 60 mates with upper panel portion 62c of the panel member 62 thereby providing a second seam along which the upper member 60 can be welded to the panel member 62.

The lower beam portion 52 is formed of a cab-side lower member 64 and a bed-side lower member 66. The cab-side lower member 64 is generally a planar member that mates with the bed-side lower member 66 along an upper edge portion 64a. The bed-side lower member 66 includes a flange portion 66a that mates with the planar lower member 64 and is connected thereto via welding. The panel member 62 includes a lower edge portion 62d that mates with the flange portion 66a on a side opposite the lower member 64 (i.e., the panel member abuts or rests against a bed-side of the lower member 66 and thereby the lower beam portion 52).

As will be appreciated by those skilled in the art, the side beam portions 56,58 are generally similar to one another, except that they are structurally mirrored relative to one another. Thus, any description concerning one of the side beam portions 56,58 is generally applicable to the other of the portions 56,58 and only the portion 58 will be described in further detail herein. The side beam portion 58 is formed of a cab-side member 70 and a bed-side member 72 and extends vertically along a lateral edge of the panel portion 50. As will be described in more detail below, the members 70,72 forming the side beam portion 58 connect the panel member 62 to the side panel structure 30 and to the frame rail 26. The side beam portion 58 includes arm portions 58a,58b that are received in, respectively, the lower beam portion 52 and the upper beam portion 54. More particularly, the arm portions 58a,58b have cross-sectional areas that substantially match or are slightly smaller than the lower and upper beam portions 52,54 and fit therein in mating engagement.

The bed-side member 72 includes flange portions 72a that are received in the lower beam portion 52 in mating relation with the lower member 66 and connected via welding. Also via welding, bottom flange 72b secures the bed-side member 72 to the adjacent frame rail 26 and side flanges 72c secure the member 72 to the side panel structure 30. Flange 72d mates with an opposed flange 70a of the member 70 to provide a seam along which the members 70,72 are welded together. Flange 72e provides a surface along which a lateral edge portion 62e can mate thereby allowing the panel 62 to be secured to the member 58 on a bed-side thereof. The cab-side member 70 includes flange portions 70b secured to the side panel structure 30. The side panel structure 30 can have a reinforcing member 78 disposed opposite the members 70,72. The reinforcing member 78 includes flanges 78a for attachment to the side panel structure 30 via welding.

First bracket 80 connects the upper beam portion 54 and, particularly, the panel member 62 directly to the side panel structure 30. A similar second bracket (not shown), on the other side of the vehicle 12, also connects the upper beam portion 54 and the panel member 62 directly to the side panel structure 28. Only bracket 80 need be described in further detail herein, as the opposed brackets are substantially similar to one another. The bracket 80 includes a first portion 80a through which fasteners 82, such as bolts, fixedly secure or mount the bracket to the bed-side beam portion 62a. A second portion 80b is oriented approximately normal relative to the first portion 80a and is fixedly secured or mounted to the side panel structure 30 via one or more fasteners 84, such as bolts. Loop connector portion 80c extends from the portion 80b and into the bed 14 for enabling tie-down devices to be used in conjunction therewith for securing cargo carried in the bed 14.

Figure 3:
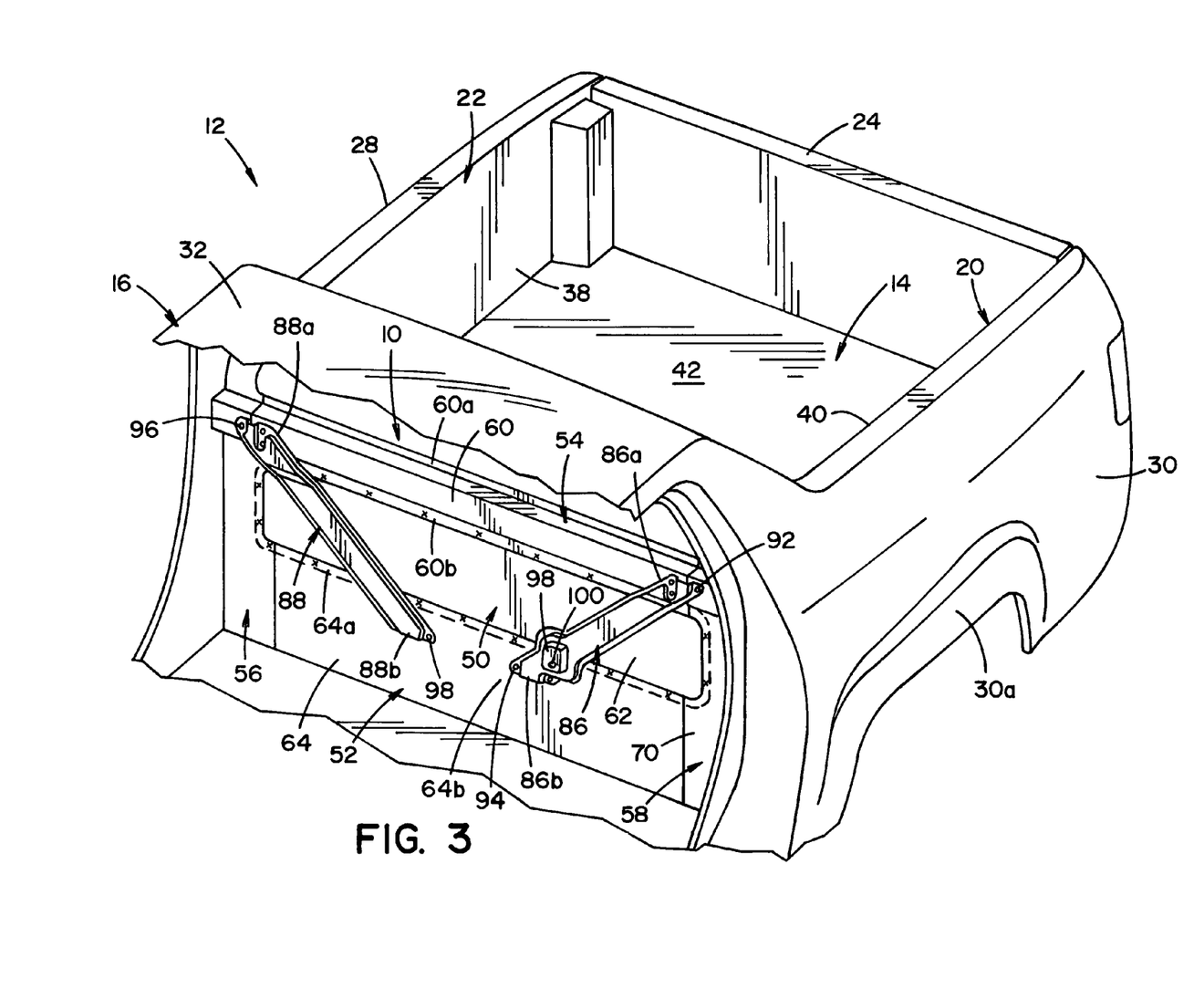
FIG. 3 is a partial perspective front view of the vehicle of FIG. 1 with the wall structure.

With additional reference to FIG. 3, the wall structure 10 further includes first and second cross braces 86,88, also referred to herein as angled reinforcing beams, for reinforcing the wall structure and the connections between the various components forming the wall structure 10. The cross brace 86 extends from a connection between the side beam portion 58 and the upper beam portion 60 to a central area 64*b* of the cab-side lower member 64 adjacent an upper edge thereof. Likewise, the cross brace 88 extends from a connection between the side beam portion 56 and the upper beam portion 60 to the central area 64*b*. Thus, the cross braces extend from the upper beam portion 60 adjacent respective first and second sidewall structures to the central area 64*b*.

More particularly, an upper portion 86*a* of cross brace 86 bridges the side beam portion 58 and the upper beam portion 60. In the illustrated embodiment, the upper portion 86*a* includes openings 90 for receiving fasteners 92 (such as the bolt and nut fastener shown in FIG. 5) to fixedly secure the cross brace 86 to the portions 58,60. A lower portion 86*b* of the cross brace 86 also includes openings 90 which are adapted for receiving fasteners 94 (such as the bolt and nut fastener shown in FIG. 5) to fixedly secure the cross brace 86 to the lower beam portion 52 and, more particularly, to the lower member 64. An upper portion 88*a* of cross brace 88 bridges the side beam portion 56 and the upper beam portion 60. The upper portion 88*a* includes openings (not shown) for receiving fasteners 96 to fixedly secure the cross brace 88 to the portions 56,60. A lower portion 88*b* of the cross brace 88 includes more openings adapted for receiving fasteners 98 to fixedly secure the cross brace 88 to the lower beam portion 52 and, more particularly, to the lower member 64.

One or both of the cross braces 86,88 can include portions or can overlap portions of the member 64 or panel 62 to which seatbelts (not shown) are anchored for a set of rear seats disposed in the cab portion 16 adjacent the wall structure 10. In the illustrated embodiment, the cross brace 86 includes a raised portion 99 having an opening 100 for mounting or anchoring a seatbelt thereto. Of course, as will be appreciated by those skilled in the art, the exact configuration of the cross braces 86,88 depends on the type of seat belts used and desired anchoring locations of the seatbelts. Additionally, seat anchors (not shown) of the variety often employed for anchoring child safety seats can be mounted to the wall structure 10 and, optionally, to the cross braces 86,88.

Figure 4:
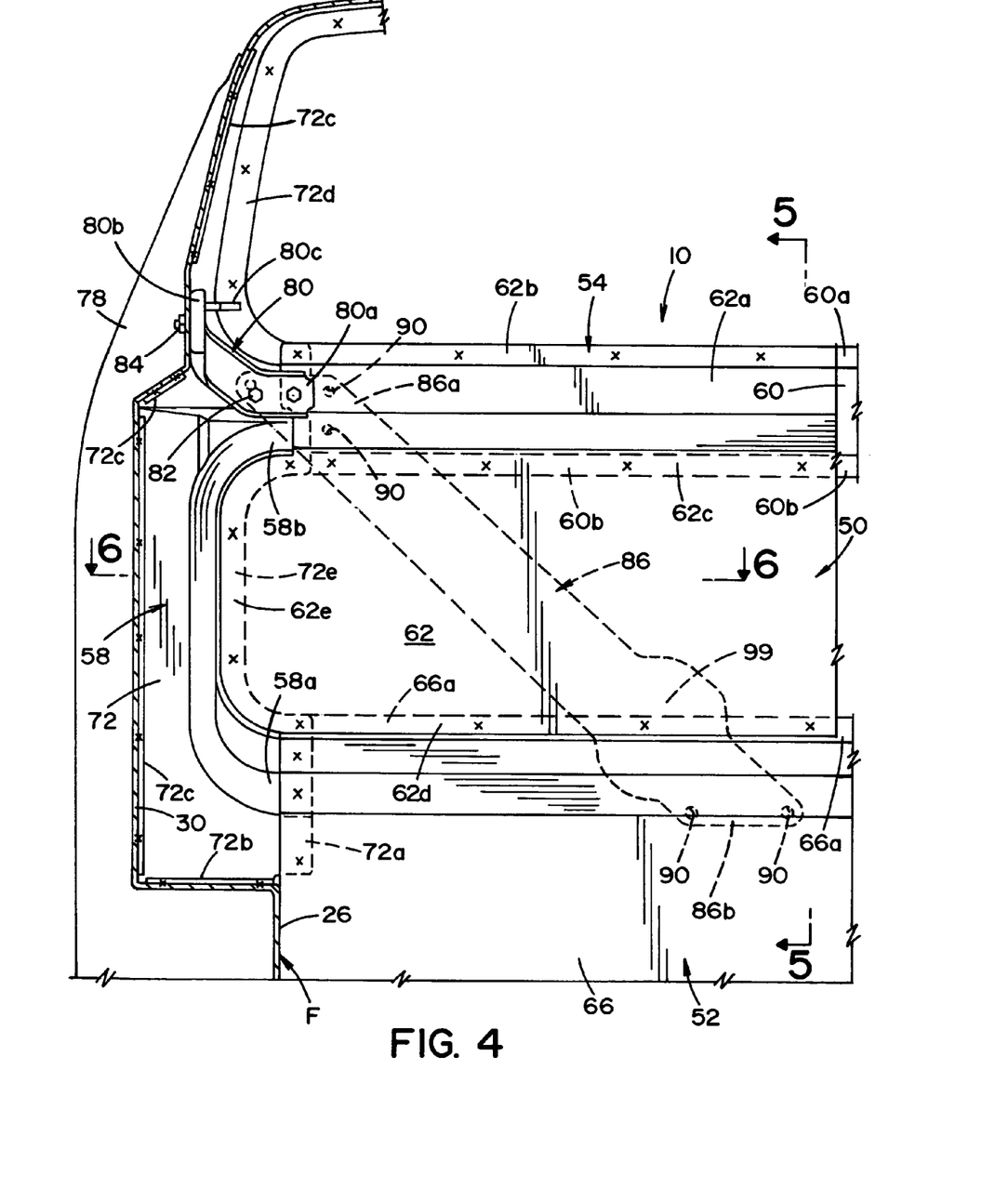
FIG. 4 is a partial rear elevational view of the wall structure of FIG. 3.

With still further reference to FIG. 4, the cross braces 86,88 attach to the upper beam portion 54 at locations spaced opposite the brackets (only bracket 80 shown). FIG. 4 shows only cross brace 86 and bracket 80, but it is to be appreciated that the relative positioning of these components is applicable to the other bracket and cross brace 88, as will be appreciated by those skilled in the art. In particular, the portion 88*a* is positioned directly opposite the bracket portion 80*a* which has the effect of increasing the rigidity of the wall structure 10.

The exemplary embodiment has been described with reference to the embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A vehicle frame having a cab portion and a load-carrying bed, said vehicle frame comprising:

sidewall structures opposed and spaced from one another forming sides of the cab portion and sides of the load-carrying bed;

a nonmovable wall structure extending between said spaced sidewall structures and separating the cab portion and the load-carrying bed, said wall structure forming a rear wall of the cab portion and a forward wall of the load-carrying bed; said wall structure including:

a static panel portion, and at least one hollow beam portion reinforcing said panel portion, said at least one hollow beam portion including lower and upper beam portions extending horizontally between said sidewall structures, said upper beam portion spaced from said lower beam portion, ends of said upper beam portion fixed and nonmovably secured to said sidewall structures;

a first cross brace extending from said upper beam portion adjacent said first sidewall structure at an angle to a central area of said lower beam portion; and a second cross brace extending from said upper beam portion adjacent said second sidewall structure at an angle to said central area.

2. A vehicle frame having a cab portion and a load-carrying bed, said vehicle frame comprising:

sidewall structures opposed and spaced from one another forming sides of the cab portion and sides of the load-carrying bed;

a nonmovable wall structure extending between said spaced sidewall structures and separating the cab portion and the load-carrying bed, said wall structure forming a rear wall of the cab portion and a forward wall of the load-carrying bed; said wall structure including:

a static panel portion, and at least one hollow beam portion reinforcing said panel portion, said at least one hollow beam portion including a horizontally extending portion extending horizontally between said sidewall structures and including a vertically extending portion extending vertically along a lateral edge of said panel portion and connecting said panel portion to an adjacent one of said sidewall structures, wherein said vertically extending portion includes an arm portion received within said horizontally extending portion.

3. The vehicle frame of claim 2 wherein said static panel portion is a single static panel portion separating the cab portion and the load-carrying bed, the panel portion having a first surface exposed to a passenger compartment defined by said cab portion and a second, opposite side exposed to a load-carrying storage area defined by said load carrying bed.

4. The vehicle frame of claim 2 wherein said at least one hollow beam portion is formed of an upper member and a beam portion of a panel member and said panel portion is formed by a remainder of said panel member.

5. The vehicle frame of claim 2 further including:

a bracket mounted to said wall structure and to one of said sidewall structures to directly connect and fixedly secure said wall structure to said one of said sidewall structures, said bracket having a first leg extending laterally along said wall structure and a second leg extending longitudinally along said one of said sidewall structures, said legs oriented approximately perpendicular to one another.

6. The vehicle frame of claim 2, further including a pair of frame rails spaced apart from one another, and wherein said at least one beam portion is welded to said panel portion and welded to an adjacent one of said frame rails.

7. The vehicle frame of claim 2 wherein said at vertically extending portion includes:
   a first side beam portion connecting said panel portion to a first one of said sidewall structures; and
   a second side beam portion spaced from and in opposing relation to said first side beam portion, said second side beam portion connecting said side panel portion to a second one of said sidewall structures.

8. The vehicle frame of claim 7 wherein said wall horizontally extending portion includes:
   a lower hollow beam portion extending between said first and second side beam portions to reinforce said panel portion; and
   an upper hollow beam portion extending between said first and second side beam portions to further reinforce said panel portion.

9. The vehicle frame of claim 8 wherein said wall structure further includes:
   at least one angled reinforcing beam extending from a connection between one of said side beam portions and said upper beam portion to a central area of said lower beam portion.

10. The vehicle frame of claim 8 further including a nonmovable first bracket connecting said upper beam portion directly to a first one of said sidewall structures and a nonmovable second bracket connecting said upper beam portion directly to a second one of said sidewall structures.

11. The vehicle frame of claim 2 wherein said vehicle frame further includes a platform portion including frame rails spaced apart from one another and at least one cross member extending between and connecting the frame rails, said sidewall structures and said wall structure secured to said platform portion via welding to form a unibody frame.

12. A vehicle frame having a cab portion and a load-carrying bed, said vehicle frame comprising:
   sidewall structures opposed and spaced from one another forming sides of the cab portion and sides of the load-carrying bed;
   a wall structure extending between said spaced sidewall structures and separating the cab portion and the load-carrying bed, said wall structure forming a rear wall of the cab portion and a forward wall of the load-carrying bed, said wall structure including:
      static panel portion,
      at least one hollow beam portion extending vertically along a lateral edge of said panel portion and connecting said panel portion to an adjacent one of said sidewall structures, wherein said at least one beam portion includes a first side beam portion connecting said panel portion to a first one of said sidewall structures and a second side beam portion spaced from and in opposing relation to said first side beam portion, said second side beam portion connecting said side panel portion to a second one of said sidewall structures,
      a lower hollow beam portion extending between said first and second side beam portions to reinforce said panel portion, and
      an upper hollow beam portion extending between said first and second side beam portions to further reinforce said panel portion,
   wherein said first and second side beam portions include arm portions received in respective lower and upper hollow beam portions.

13. The vehicle frame of claim 12 wherein said arm portions have cross-sectional areas that substantially match said lower and upper hollow beam portions.

14. A unibody frame in a vehicle having a load-carrying bed and a cab portion, said unibody frame comprising:
   a platform portion including frame rails spaced apart from one another and adjacent sides of the vehicle and at least one cross member extending between and connecting the frame rails;
   principal body panels connected to said platform portion, said principal body panels including opposed, side panel structures forming sides of the vehicle and a nonmovable wall structure extending between said side panel structures and dividing the load-carrying bed and the cab portion, said wall structure including:
      a panel portion oriented approximately normal relative to said side panel structures and fixedly secured thereto along lateral edges of said panel portion, said panel portion forming a rear wall of the cab portion and a forward wall of the load-carrying bed, and
      a first side beam portion extending along a first lateral edge of said panel portion and a first one of said side panel structures, said first side beam portion welded to said panel portion along said first lateral edge and welded to said first one of said side panel structures to nonmovably secure said first lateral edge to said first one of said side panel structures;
      a second side beam portion extending along a second edge of said panel portion and a second one of said side panel structures, said second side beam portion welded to said panel portion along said second lateral edge and welded to said second one of said side panel structures to nonmovably secure said second lateral edge to said second one of said side panel structures;
      an upper beam portion extending between said first and second side beam portions, said upper beam portion welded to said panel portion along a top edge thereof and having opposite ends welded to said side beam portions; and
      a lower beam portion extending between said first and second side beam portions spaced from said upper beam portion.

15. The unibody frame of claim 14 further including a first bracket nonmovably connecting said upper beam portion to said first one of said side panel structures and a second bracket nonmovably connecting said upper beam portion to said second one of said side panel structures, said first bracket having a first leg secured to said upper beam portion and a second leg secured to said first one of said side panel structures to transmit impact forces received by said wall structure to said first one of said side panel structures, said second bracket having a first leg secured to said upper beam portion and a second leg secured to said second one of said side panel structures to transmit impact forces received by said wall structure to said second one of said side panel structures.

16. The unibody frame of claim 15 further including an angled reinforcing beam extending from said upper beam portion to said lower beam portion at an angle relative to said first side beam portion.

17. The unibody frame of claim 15 wherein said first legs of said first and second brackets extend transversely along said upper beam portion and said secured legs of said first and second brackets, which are oriented approximately normal relative to said first legs, extend longitudinally along said side panel structures in a rearward direction relative to said wall structure.

18. The unibody frame of claim 14 wherein said first and second side beam portions include arm portions received in at least one of said upper and lower beam portions.

19. A wall structure in a unibody vehicle frame separating a cab portion and a load-carrying bed, said wall structure comprising:
- a welded in place, vertically oriented panel portion forming a rear wall of the cab portion and a forward wall of the load-carrying bed;
- at least one hollow beam portion having a horizontally extending portion extending horizontally between side panel structures of the unibody vehicle frame to reinforce said panel portion and a vertically extending portion extending vertically along a lateral edge of said panel portion for connecting said panel portion to an adjacent one of said side panel structures, which includes an arm portion cooperatively received within one end of said horizontally extending portion.

20. The wall structure of claim 19 further including:
- a bracket connecting said at least one hollow beam portion to the side panel structures to transmit impact forces received by said vertically oriented panel portion to the side panel structures.

* * * * *